No. 668,644. Patented Feb. 26, 1901.
W. J. HUTSON.
WHEELWRIGHT MACHINE.
(Application filed Oct. 8, 1900.)
(No Model.)
Fig. I.
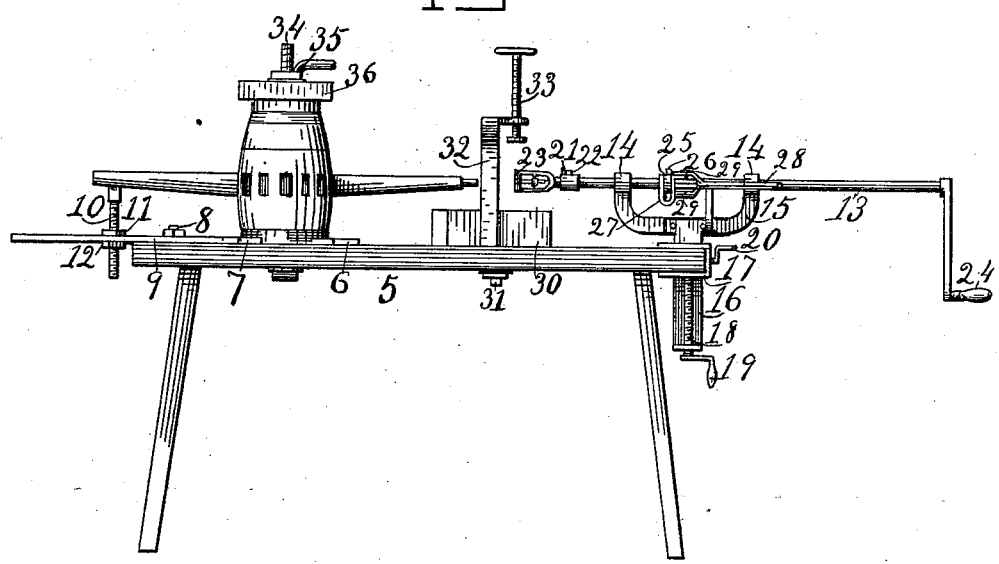
Fig. II.
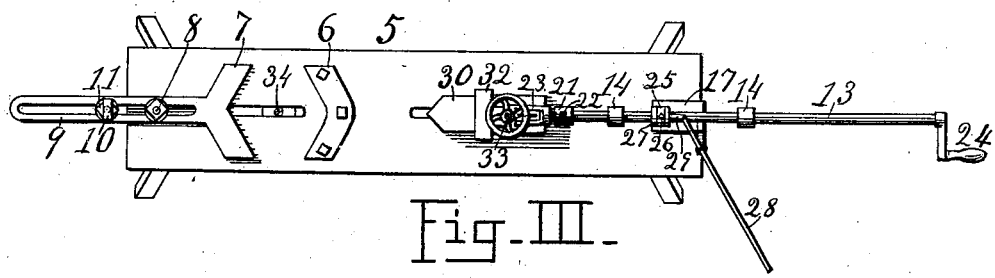
Fig. III.
WITNESSES,
G. W. Stevens.
N. Stevens.
INVENTOR.
Washington J. Hutson.
by W. K. Stevens ATTY.
THE NORRIS PETERS CO., PHOTO-LITHO., WASHINGTON, D. C.

UNITED STATES PATENT OFFICE.

WASHINGTON J. HUTSON, OF FLATWOODS, TENNESSEE.

WHEELWRIGHT-MACHINE.

SPECIFICATION forming part of Letters Patent No. 668,644, dated February 26, 1901.

Application filed October 8, 1900. Serial No. 32,390. (No model.)

*To all whom it may concern:*

Be it known that I, WASHINGTON J. HUTSON, a citizen of the United States, residing at Flatwoods, in the county of Wayne and State of Tennessee, have invented a new and useful Improvement in Wheelwright-Machines; and I do hereby declare the following to be a full, clear, and exact description of the same.

This invention relates to such machinery as may be used by the wheelwright in making wagon and carriage wheels. Hubs mortised for spokes and bored for boxes, spokes turned and tenoned to fit the hub, and rims bent half-round or segmental fellies are now common articles of merchandise sold by general carriage-furnishing stores; and the object of this invention is to aid the wheelwright to hold the hub while driving the spokes into it and to guide the spokes to enter at the angle that will give proper dish to the wheel, to bore the rim-tenons on a uniform plane, to hold the rim while boring the spoke-tenon holes in it, and to hold axles and various other portions of a wagon while boring for mortises or bolts.

To this end my invention consists in the construction and combination of parts forming a wheelwright-machine hereinafter described and claimed, reference being had to the accompanying drawings, in which—

Figure I is a side elevation of a wheelwright-machine according to my invention, showing a portion of a wheel in the process of being made. Fig. II is a top view of the machine. Fig. III represents the rest-block and hollow auger in end view.

Numeral 5 represents a wooden bench.

6 is a forked rest firmly secured to the bench to support the hub of a wheel to be worked upon, the larger end of the hub resting on the bench and its band resting sidewise in the forked rest.

7 is a forked clamping-jaw having a long slotted shank 9 to receive one or more bolts 8, that fasten it to the bench 5.

10 is a spoke-rest. It is a screw-bolt passing through the slot in shank 9 and having two nuts 11 12, the one above and the other below the shank to bind it firmly thereto.

13 is a spindle mounted to rotate and to slide longitudinally in bearings 14 of a yoke 15, whose body 16 is fitted to slide up and down in guideways 17.

18 is a long screw mounted in the body 16 and threaded through the guideway 17 and provided with a crank 19, whereby it may be turned to raise or lower the yoke 15 and the spindle 13, mounted therein.

20 is a binding-screw with a crank-handle for holding the yoke-body firmly at any point of its elevation. The spindle 13 is provided with a socket-head 21 and binding-screw 22 for holding a hollow auger 23 or other bits or tools, and with a crank 24, whereby it may be rotated to work by hand.

25 is a collar adjustably secured upon the spindle 13 by means of a binding-screw 26.

27 is a yoke straddling the collar 25, and 28 is a forked lever straddling the spindle and connected above and below with the yoke by pitmen 29.

30 is a rest-block secured upon the bench by a bolt 31 and supporting two upright bars 32, that are joined at the top to serve as a bearing for the binding-screw 33.

34 is a bolt passing down through a short slot in the bench and provided with a handnut 35 and a strap-block 36 for securing hubs upon the bench.

In operation a wheel-hub is to be placed on the bolt 34, then the strap-block 36, and then the nut 25 is placed on the bolt, and the nut is to be turned down easily. Now rap on the end of the shank 9 until the hub is driven closely between the forks 7 and 6 and then bind the shank 9 by the bolts 8 and the bolt 34 by the nut 35 until the hub is rigidly held. Now place a spoke, with its tenon, in a mortise in the hub and its body on the rest 10, then raise or lower the rest until the spoke inclines at the proper angle with the axis of the hub to give the desired dish to the wheel, and fasten the rest by means of nuts 11 and 12. Then proceed to drive the spokes one after another, thus guided by the spoke-rest, turning the hub to bring another mortise in line after each spoke is driven, first loosening the binding-bolt 34, that holds the hub. When the spokes are all driven, the wheel may be rotated in the forks 6 7 and be marked relatively to the rest and then be sawed off at the mark, making them all of one length, so that the wheel will be round when complete.

The rest 10 may be set along the slot in shank 9 to suit wheels of different diameters. Now raise the spindle 13 to the required level by means of screw 18 and bind its support firmly by the screw 20. Now with a hollow auger 23 in the socket 22 proceed to bore tenons on the ends of the spokes, bring them to place one at a time, and turn the spindle by means of crank 24, while pressing it forward with the lever 28. When the tenons are done on the ends of the spokes, a rim or fellies may be driven thereon to complete the filling or making up of the wheel. To use the rest-block 30, place across it and against the uprights 32 the axle or other piece that is to be bored, loosen the bolt 31 and turn the block on the bench to the angle required for the hole, place in the socket 21 the boring-bit, and then by means of screws 18 and 20 set the spindle to the right height and fix it there. Now the boring may be accurately done by working the crank 24 and lever 28, as before described, the axle being held by the work-binding screw 33. The uprights 32 are so far apart as not to interfere with wheel-work, the hollow auger advancing freely between them.

With common workman's tact this machine may be used for a great many purposes not above enumerated, and it has the advantage of such construction that nearly all its parts may be made and set up by a blacksmith. It is simple and inexpensive.

Having thus fully described my invention, what I believe to be new, and desire to secure by Letters Patent, is the following:

In wheelwright-machines, a bench having a slot vertically through it; a forked rest secured at one end of the slot and another forked rest having a slotted shank at the other end of the slot in the bench; one or more binding-bolts in the bench for the said shank; a spoke-rest consisting of a bolt passing through the slot in the shank, and screw-nuts on the bolt above and below the shank; and a bolt with a screw-nut and strap for the slot in the bench, substantially as described.

In testimony whereof I affix my signature in presence of two witnesses.

WASHINGTON J. HUTSON.

Witnesses:
J. A. KING,
E. S. CHAPPELL.